US008681470B2

(12) United States Patent
Gorczyca et al.

(10) Patent No.: US 8,681,470 B2
(45) Date of Patent: Mar. 25, 2014

(54) ACTIVE IONIZATION CONTROL WITH INTERLEAVED SAMPLING AND NEUTRALIZATION

(75) Inventors: John A. Gorczyca, Lansdale, PA (US); Manuel C. Blanco, Hillsborough, NJ (US); Steven J. Mandrachia, Eagleville, PA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/591,427

(22) Filed: Aug. 22, 2012

(65) Prior Publication Data

US 2014/0054470 A1 Feb. 27, 2014

(51) Int. Cl.
*H02H 1/00* (2006.01)
*H05F 3/06* (2006.01)

(52) U.S. Cl.
USPC ............................ 361/212; 250/251; 361/235

(58) Field of Classification Search
USPC ......................... 361/213, 229, 231, 233, 235; 250/423 R; 438/516
See application file for complete search history.

(56) References Cited

U.S. PATENT DOCUMENTS

| | | | | |
|---|---|---|---|---|
| 3,935,517 | A * | 1/1976 | O'Brien | 361/229 |
| 4,234,249 | A * | 11/1980 | Weikel et al. | 399/89 |
| 4,423,461 | A * | 12/1983 | Kaainoa et al. | 361/235 |
| 4,757,422 | A * | 7/1988 | Bossard et al. | 361/231 |
| 4,809,127 | A * | 2/1989 | Steinman et al. | 361/213 |
| 4,901,194 | A * | 2/1990 | Steinman et al. | 361/213 |
| 5,930,105 | A * | 7/1999 | Pitel et al. | 361/212 |
| 6,130,815 | A | 10/2000 | Pitel et al. | |
| 6,259,591 | B1 * | 7/2001 | Pitel et al. | 361/212 |
| 6,375,714 | B1 * | 4/2002 | Rump et al. | 95/3 |
| 7,180,722 | B2 * | 2/2007 | Jacobs et al. | 361/231 |
| 7,256,979 | B2 * | 8/2007 | Sekoguchi et al. | 361/231 |
| 7,372,023 | B2 * | 5/2008 | Sobek et al. | 250/288 |
| 7,522,402 | B2 * | 4/2009 | Kraz et al. | 361/231 |
| 7,763,853 | B2 * | 7/2010 | Walsh | 250/326 |
| 8,039,789 | B2 | 10/2011 | Gorczyca et al. | |
| 2003/0067732 | A1 * | 4/2003 | Richie et al. | 361/213 |
| 2004/0239346 | A1 * | 12/2004 | Iyer et al. | 324/713 |
| 2008/0232021 | A1 * | 9/2008 | Gefter et al. | 361/213 |
| 2009/0127452 | A1 * | 5/2009 | Gorczyca et al. | 250/252.1 |
| 2009/0128981 | A1 | 5/2009 | Gorczyca et al. | |
| 2010/0220243 | A1 * | 9/2010 | Chien et al. | 348/733 |

FOREIGN PATENT DOCUMENTS

| | | |
|---|---|---|
| WO | 2007118182 | 10/2007 |

* cited by examiner

*Primary Examiner* — Phillip A Johnston
*Assistant Examiner* — Brooke Purinton
(74) *Attorney, Agent, or Firm* — Panitch Schwarze Belisario & Nadel LLP

(57) ABSTRACT

A method for optimizing performance of a static neutralizing power supply coupled to a controller and configured to provide an output to at least one ionizer includes, (a) during a first time period, sensing a current flow to the at least one ionizer, and (b) comparing, in the controller, an expected current flow to the sensed current flow. A difference between the expected and sensed current flows is proportional to a charge on an object to be neutralized proximate the at least one ionizer. The method further includes (c) adjusting, by the controller and based on the comparison, one or more properties of the output to the at least one ionizer to neutralize the charge on the object during a second time period following the first time period, and (d) periodically repeating steps (a)-(c) for successive first and second time periods.

18 Claims, 6 Drawing Sheets

ACTIVE IONIZATION CONTROL WITH INTERLEAVED SAMPLING AND NEUTRALIZATION

BACKGROUND OF THE INVENTION

Embodiments of the present invention are directed to a neutralization system, and more particularly, to a neutralization system with interleaved periods of sampling and neutralization to optimize neutralization of a target object.

Air ionization is an effective method of eliminating static charges on target surfaces. Air ionizers generate large quantities of positive and negative ions in the surrounding atmosphere that serve as mobile carriers of charge in the air. As ions flow through the air, they are attracted to oppositely charged particles and surfaces. Neutralization of electrostatically charged surfaces can be rapidly achieved through this process.

Air ionization may be performed using electrical ionizers, which generate ions in a process known as corona discharge. Electrical ionizers generate air ions by intensifying an electric field around a sharp point until the field overcomes the dielectric strength of the surrounding air. Negative corona discharge occurs when electrons are flowing from the electrode into the surrounding air. Positive corona discharge occurs as a result of the flow of electrons from the air molecules into the electrode.

Ionizer devices, such as an alternating current (AC) or direct current (DC) charge neutralizing system, take many forms, such as ionizing bars, air ionization blowers, air ionization nozzles, and the like, and are utilized to neutralize static electrical charge by emitting positive and negative ions into the workspace or onto the surface of an area. Ionizing bars are typically used in continuous web operations such as paper printing, polymeric sheet material, or plastic bag fabrication. Air ionization blower and nozzles are typically used in workspaces for assembling electronics equipment such as hard disk drives, integrated circuits, and the like, that are sensitive to electrostatic discharge (ESD).

Neutralization output can be adjusted in response to the determination of charge on the target object. FIG. 1 is a schematic block diagram of an exemplary prior art neutralization system 10. A target, such as a moving web 12 having an undesirable charge thereon is passed by an ionizer bar 14 with ionizers, such as pins, generating positive and negative ions. Downstream of the ionizer bar 14 is an external sensor 16 that detects a residual charge on the moving web 12. Data from the sensor 16 is passed into a controller 20 disposed within a housing 18 and coupled to one or more high voltage power supplies 22*a*, 22*b*, which are in turn coupled to the ionizer bar 14. Based on the sensor data, the controller 20 generates and outputs signals representing adjustments necessary to the output of the high voltage power supplies 22*a*, 22*b* in order to optimize neutralization on the target web 12. The high voltage power supplies 22*a*, 22*b* are coupled to the ionizer bar 14 by one or more high voltage cables 24.

The use of a downstream sensor has significant drawbacks, such as the need for additional costly equipment and connecting cables that may be too large or awkward to practically place into the workspace. Some sensors may also not be approved for placement in hazardous locations (e.g., areas at risk of fire or explosion hazards).

In addition, over time, an ionizer may accumulate debris. In order to maintain optimal performance of the ionizer, it is necessary to clean the ionizer in order to remove the debris. As an ionizer accumulates debris, the ionizer's charge will decrease and, therefore, the current flowing from the voltage supply into the ionizer will also decrease. A method for having the ionization self-calibrate and indicate performance is described in U.S. Pat. No. 8,039,789, the entire contents of which are incorporated by reference herein. However, the method requires the initial accumulation of calibration data for a plurality of operating states of the high voltage power supply. Real-time data, in particular a sum of the current output to the positive and negative ionizers, acquired during operation is then compared to the closest data point to determine a difference in performance. The accumulation of calibration data for what may be 250 or more data points can be time consuming, and requires a large memory space to store the necessary baseline table.

It is desirable to provide a static neutralization system that can optimize neutralization of a target object without the need for an external downstream sensor.

BRIEF SUMMARY OF THE INVENTION

Briefly stated, an embodiment of the present invention comprises a method for optimizing performance of a static neutralizing power supply coupled to a controller and configured to provide an output to at least one ionizer. The method includes, (a) during a first time period, sensing a current flow to the at least one ionizer, and (b) comparing, in the controller, an expected current flow to the sensed current flow. A difference between the expected and sensed current flows is proportional to a charge on an object to be neutralized proximate the at least one ionizer. The method further includes (c) adjusting, by the controller and based on the comparison, one or more properties of the output to the at least one ionizer to neutralize the charge on the object during a second time period following the first time period, and (d) periodically repeating steps (a)-(c) for successive first and second time periods.

Another embodiment of the present invention comprises a method for optimizing performance of a static neutralizing power supply coupled to a controller and configured to provide a first output to at least one positive ionizer and a second output to at least one negative ionizer. The method includes (a) during a first time period, sensing a first current flow to the at least one positive ionizer and a second current flow to the at least one negative ionizer, (b) determining a net current flow from the first and second current flows, and (c) comparing, in the controller, an expected net current flow to the determined net current flow. A difference between the expected and sensed current flows is proportional to a charge on an object to be neutralized proximate the at least one positive ionizer and the at least one negative ionizer. The method further includes (d) adjusting, by the controller and based on the comparison, at least one of a duty cycle or amplitude of at least one of the first and second outputs provided by the power supply to neutralize the charge on the object during a second time period following the first time period, and (e) periodically repeating steps (a)-(d) for successive first and second time periods.

Yet another embodiment of the present invention comprises a static neutralizing apparatus including a power supply, at least one ionizer coupled to the power supply and receiving an output therefrom, and a controller coupled to the power supply to control the output to the at least one ionizer. The controller is configured to (i) during a first time period, sense a current flow to the at least one ionizer, and (ii) compare an expected current flow to the sensed current flow. A difference between the expected and sensed current flows is proportional to a charge on an object to be neutralized proximate the at least one ionizer. The controller is further configured to (iii) adjust, based on the comparison, one or more properties of the output to the at least one ionizer to neutralize the charge on the object during a second time period following the first time period, and (iv) periodically repeat steps (i)-(iii) for successive first and second time periods.

Still another embodiment of the present invention comprises a method for optimizing performance of a static neutralizing power supply coupled to a controller and configured to provide an output to at least one ionizer. The method includes placing the power supply in a calibration mode, stepping the power supply through one or more of a range of adjustments, collecting expected current flow values at each step and storing the calibration data in a memory, placing the power supply in an operating mode, sensing a real-time current flow to the at least one ionizer, comparing, in the controller, the sensed real-time current flow to the one of the expected current flow values and determining difference values therebetween, and using the difference values to adjust, by the controller, one or more properties of the output to the at least one ionizer to restore the real-time current flow to one of the expected current flow values.

BRIEF DESCRIPTION OF THE DRAWINGS

The foregoing summary, as well as the following detailed description of preferred embodiments of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

DETAILED DESCRIPTION OF THE INVENTION

Figure 1:
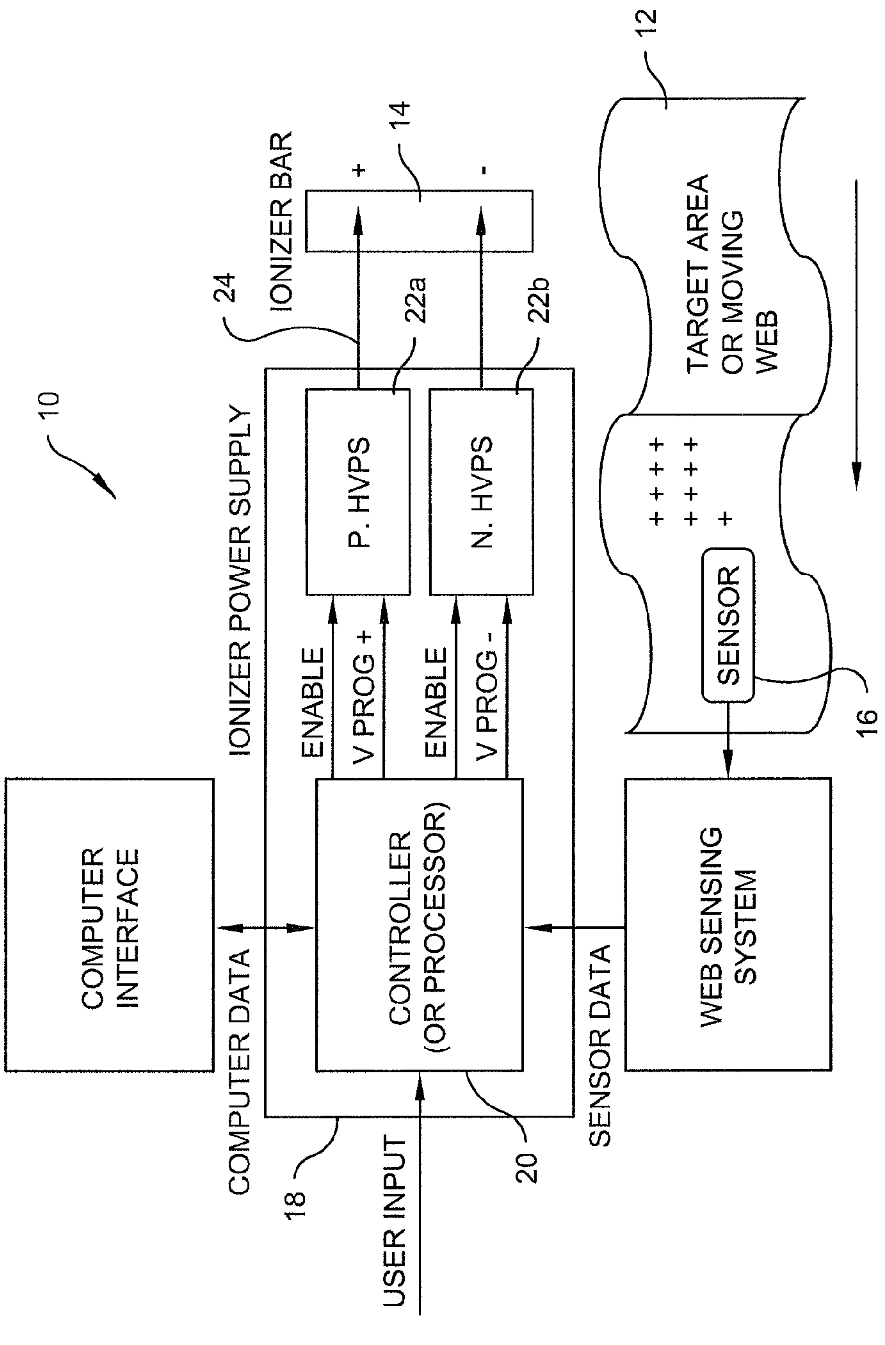
Fig. 1 (Prior Art)
FIG. 1 is a schematic block diagram of a prior art ionization system.

Certain terminology is used in the following description for convenience only and is not limiting. Additionally, the words “a” and “an”, as used in the claims and in the corresponding portions of the specification, mean “at least one.” In the drawings, the same reference numerals indicate like elements throughout.

Figure 2:
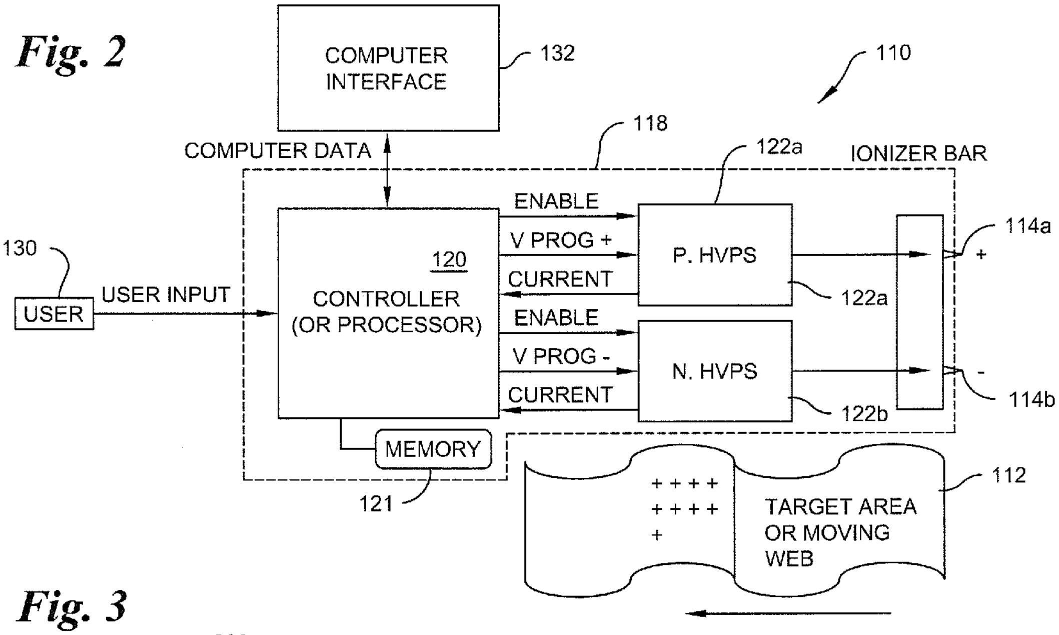
FIG. 2 is a schematic block diagram of an ionization system in accordance with a preferred embodiment of the present invention.

Referring to FIG. 2, a first preferred embodiment of a neutralization system 110 is shown. A controller, processor, or other controlling circuitry 120 or processor 120 (for simplicity, hereinafter referred to as “controller 120”) preferably controls the functionality of the neutralization system 110. The controller 120 may accept input directly from a user 130, a computer interface 132 coupled to an external computer (not shown), or the like. Various high voltage generating topologies can be used in the preferred embodiments of the present invention. In particular, various controllers 120, such as microcontrollers or microprocessors, can be used in the application of the preferred embodiments of the present invention. One suitable controller 120 is the commercially available Z8 Encore microprocessor manufactured by Zilog, Inc. The controller 120 is also preferably further in communication with a memory 121, which can be any known or suitable memory device such as random access memory (RAM), read only memory (ROM), flash RAM, hard disk, optical disk, or the like.

The controller 120 is coupled to one or more high voltage (HV) power supplies 122*a*, 122*b*, and preferably a positive HV power supply 122*a* and a negative HV power supply 122*b*. However, other HV power supplies, such an alternating current (AC) power supply, may also be used in accordance with the invention. The HV power supplies 122*a*, 122*b* supply power to an ionization emitter 114, shown in FIG. 2 as an ionizer bar 114. In a preferred embodiment, the ionizer bar 114 includes one or more ionizing pins 114*a* associated with the positive HV power supply 122*a* and a corresponding number of ionizing pins 114*b* associated with the negative HV power supply 122*b*. In other embodiments, one or pins may be alternately connected to positive and negative outputs by switches or the like, or to an AC HV power supply. In embodiments with a single direct current (DC) HV power supply, the ionizing pins of the ionizer bar 114 would receive only one polarity. The controller 120 controls the output of the HV power supplies 122*a*, 122*b* to the ionizer bar 114.

In a preferred embodiment, the controller 120, the HV power supplies 122*a*, 122*b*, and the ionizer bar 114 are disposed within a common housing 118. This eliminates the need for high voltage cables to connect the ionizer bar 114 to the power supplies 122*a*, 122*b* and provides a more efficiently sized neutralization system 110. However, embodiments of the present invention may be used with other configurations, such as, for example, the configuration shown in FIG. 1 where the ionizer bar 114 would be located externally from the HV power supplies 122*a*, 122*b*.

In the present embodiment shown in FIG. 2, the external sensor 16 in FIG. 1 is no longer necessary for determining the residual charge on the target 112. Rather, the determinations for adjustments to the output signals from the HV power supplies 122*a*, 122*b* will be described in detail below.

Embodiments of the present invention effectively use the ionizer bar 114 as the sensor for determining the charge on the target object 112. When the target object 112 bears a charge of a certain threshold, current flow at the pins 114*a*, 114*b* of the ionizer bar 114 may be induced or suppressed, based on the polarity of the charge on the target object 112. A difference between an expected current flow and the actual current flow is proportional to the charge on the target object 112, and can therefore be used to adjust the operational settings of the neutralization system 110 to better neutralize the target object 112. One method of measuring current flow at the pins 114*a*, 114*b* is described in U.S. Pat. Nos. 6,130,815 and 6,259,591, the entire contents of both of which are incorporated by reference herein.

For example, the net neutralization current output $I_{neut}$ at the ionizer pins 114*a*, 114*b* of the ionizer bar can be determined by the following equation:

$$I_{neut}=I^{+}-I^{-}-I_{0}$$

where $I^+$ is the absolute value of the output current at the positive ionizer pins 114*a*, $I^-$ is the absolute value of the output current at the negative ionizer pins 114*b*, and $I_0$ is a neutralization current present at time t=0, essentially a correction factor, which ideally would be equal to zero. The net neutralization output current $I_{neut}$ is proportional to charge on the target object 112, speed of the target object 112, and distance of the pins 114*a*, 114*b* from the target object 112. If there is insufficient charge on the target object 112 to induce or suppress current at the ionizer bar 114, then in most cases the net neutralization output current $I_{neut}$ would be zero. If $I_{neut}>0$, then the charge on the target object 112 is negative, indicating that more positive net charge is required to be output by the ionizer bar. If, on the other hand, $I_{neut}<0$, then the charge on the target object 112 is positive, and more negative net charge must be output to neutralize the target object 112.

It should be further noted that a normalized net current value $I_{norm}$ can be used to correct for effects caused by the length of the ionizer bar 114. The normalized net current is given by the equation:

$$I_{norm}=I_{neut}/I_{mag}$$

where $I_{mag}$ represents the magnitude of the neutralization current, which is given by the equation:

$$I_{mag}=I^{+}+I^{-}$$

Figure 3:
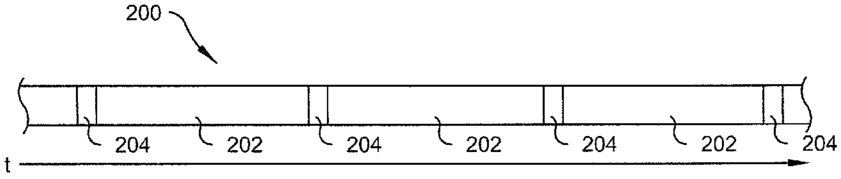
FIG. 3 is a timeline showing alternating and repeating time periods for use in accordance with preferred embodiments of the present invention.

According to embodiments of the present invention, these concepts are utilized by interleaving periods of sampling at the ionizer bar 114 with periods of normal operation for neutralizing the target object 112. For example, FIG. 3 shows a timeline 200 of operation of the neutralization system 110, which includes alternating periods of normal operation 202, wherein the neutralization system 110 is operating under normal conditions to neutralize charge on the target object 112, with sampling periods 204, during which data is collected by the controller 120 to determine whether adjustments to the operating conditions during the operation period 202 are necessary. It is preferred that the length and frequency of the sampling periods 204 is kept to a minimum, as often the neutralizing capabilities of the system 10 are compromised during the sampling period 204. However, this must be balanced against the need to monitor changes in the charge level of the target object 112, which can vary greatly over time. It is preferred that a ratio of the normal operating periods 202 to the sampling periods 204 is about 10:1, although other ratios are contemplated as well.

Figure 4:
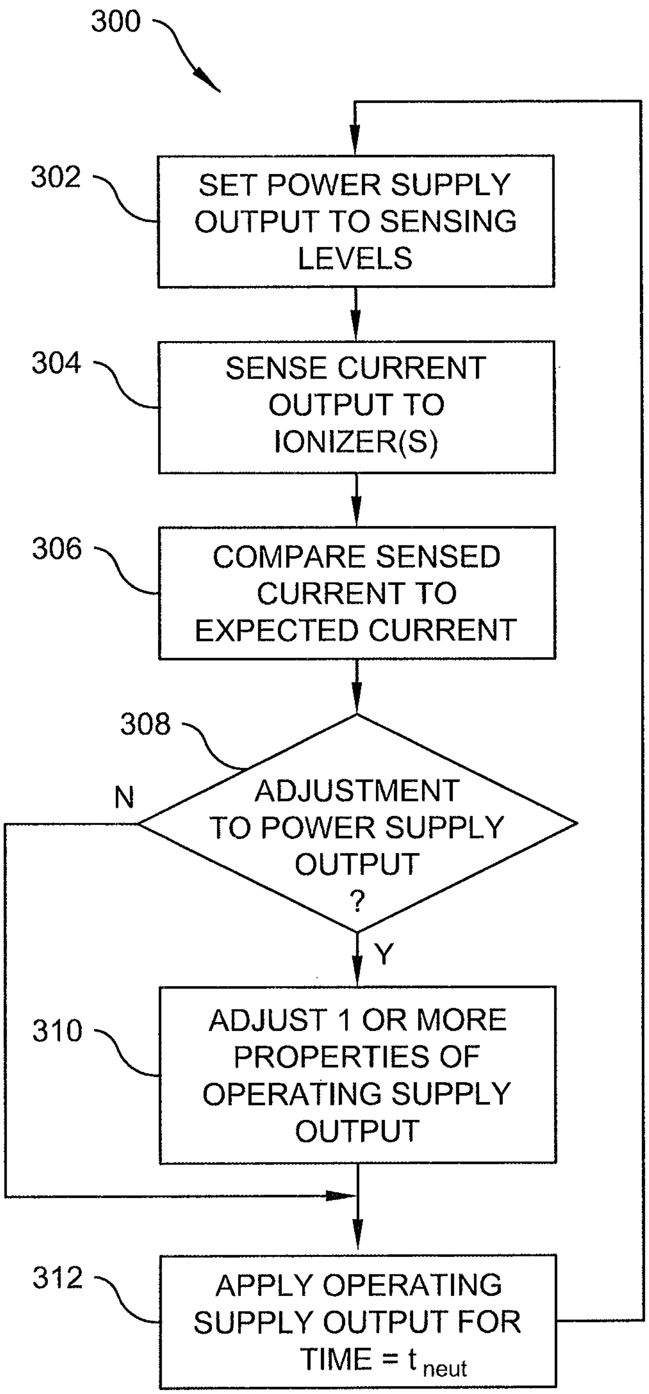
FIG. 4 is a flowchart of a process for sensing target object charge and adjusting neutralization settings in accordance with preferred embodiments of the present invention.

FIG. 4 is a flow chart of an exemplary method 300 performed by the controller 120 in accordance with preferred embodiments of the present invention. Upon entering a sampling period 204, the one or more power supplies 122*a*, 122*b* are set to sensing levels (step 302). For example, typically the output to the ionizer bar 114 is a waveform having a duty cycle, amplitude, frequency, and the like. However, in certain embodiments, the output to the respective ionizing pins 114*a*, 114*b* may be uni-polar DC signals, in which case both the positive and negative HV power supplies 122*a*, 122*b* are constantly on, rather than pulsing. The controller 120 may set the amplitude of the output of the positive and negative HV power supplies 122*a*, 122*b* to a nominal level, for example between about 4 kV to about 20 kV. The duty cycle (i.e., the ratio of positive to negative ion generation during a cycle of the waveform) is also preferably set to 50/50. The frequency and/or other characteristics of the waveform can also be set to nominal levels during the sampling period 204. By maintaining nominal voltage levels at the ionizing pins 114*a*, 114*b* during the sampling period 204, the neutralization system 110 can continue to neutralize charge on the target object 112 during the sampling period, with the effectiveness of an open-loop system.

In an alternative embodiment, the step of setting the output to sensing levels 302 may include shutting down the voltage output to the ionizer bar 114 from the power supplies 122*a*, 122. For example, the power supplies 122*a*, 122*b* may be placed into a mode or set to a set point such that no signal is output to the ionizer bar 114*a* (e.g., Vprog=0). As a result, the ionizing pins 114*a*, 114*b* are not held at any voltage, and current generated at the pins 114*a*, 114*b* is purely the result of charge on the target object 112.

At step 304, current to the ionizing pins 114*a*, 114*b* is sensed by the controller 120. At step 306, the sensed current is compared to the expected current flow based on the sensing levels, which should typically be zero as described above. Once again, the difference in expected and sensed current flows is proportional to the charge on the target object 112 passing proximate the ionizer bar 114.

Based on the comparison, at step 308, the controller 120 determines whether the properties (e.g., amplitude, duty cycle, frequency, or the like) of the output during the normal operation periods 202 are sufficient to neutralize the charge detected on the target object 112. If not, the controller 120 proceeds to step 310, where one or more of the properties are adjusted to levels that will more effectively neutralize the detected charge. Once the properties are adjusted, the output is set to the adjusted operating levels and applied for the duration of the normal operation period (step 312). It should be noted that the adjustments in step 310 can be made during the sampling period 204, during the normal operation period 202, or between the two periods 202, 204. If the determination is made at step 310 that the current neutralization settings are sufficient for neutralizing the detected charge on the target object 112, then step 310 is skipped and the controller proceeds directly to step 312. Upon entry of the next sampling period 204, the method 300 is repeated.

In another embodiment, at step 304, only the unwanted polarity of the output from the power supplies 122*a*, 122*b* is measured, while the other polarity is optimized based on the measurements of the unwanted polarity. That is, rather than basing output adjustments on a net neutralization current ($I_{neut}$) of the power supplies 122*a*, 122*b*, the sensed current is the current flow to either the positive ionizing pins 114*a* or the negative ionizing pins 114*b*, and the adjustments are made to the output of the other of the positive or negative ionizing pins 114*a*, 114*b* based on the suppression of current at the unwanted polarity. For example, if the charge on the target 112 is primarily negative, then during the sampling period 204, the suppression of current at the negative ionizing pins 114*b* is measured, and the magnitude of the suppression can be used to adjust the properties of the output, particularly at the positive ionizing pins 114*a*. This procedure similarly works for a positively charged target 112 by measuring current suppression to the positive ionizing pins 114*a* while adjusting the output of the negative HV power supply 122*b* to optimize neutralization. In this way, the sampling period 204 can occur on the portion of the duty cycle where the unwanted polarity is being applied, and the operating period 202 occurs on the remainder of the cycle where the desired polarity is being applied.

In another embodiment, during both the normal operation period 202 and the sampling period 204, both of the HV power supplies 122*a*, 122*b* output uni-polar DC signals to the respective ionizing pins 114*a*, 114*b*. As current changes are observed during the sampling period 204, the amplitude on the required polarity is adjusted incrementally. At some point, the current will saturate. Upon saturation, or a percentage thereof, there is enough voltage present on the respective ionizing pins 114*a*, 114*b* to deplete the charge on the target object 112. It should be noted that this voltage may be lower than the requirement for ionization because of field-induced current flow.

The techniques described above are merely exemplary, and other methods for establishing an expected current and determining actual current using the ionizer bar 114 may be used in keeping with the invention. It should be noted that for the methods described above, speed of the target object 112 and distance of the ionizer bar 114 from the target object 112 are two factors which may affect the calculations in converting the sensed current levels to power supply output information. Accordingly, a gain term may be applied that scales the translation accordingly. The gain term may be a positive or negative value. For example, a greater distance between the ionizer bar 114 and the target object 112 requires a higher gain term, while a close distance of the ionizer bar 114 to the target object 112 may result in over-compensation and require a negative gain term as an offset.

Figure 5:
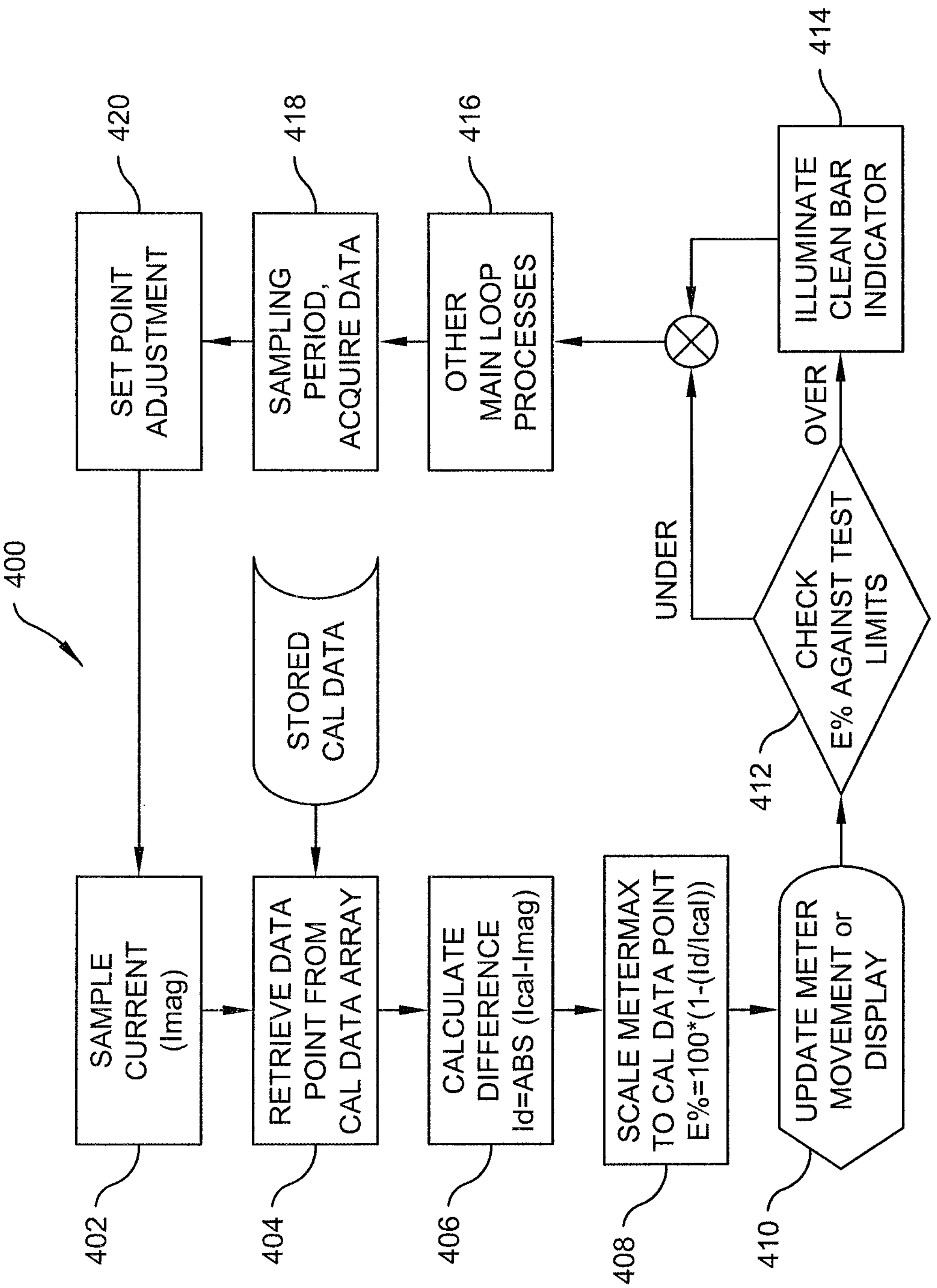
FIG. 5 is a flowchart associated with the collection of real time sampling and comparison process with set point adjustments of an ionization system in accordance with a preferred embodiment of the present invention.

FIG. 5 is a flowchart associated with the collection of real time sampling and comparison process with set point adjustments of an ionization system to determine the relative condition of the of the ionizer bar 114. The controller 120 regularly samples (step 402) the neutralization current magnitude ($I_{mag}$), which may be calculated as described above. Previously determined calibration data is retrieved from memory 121 (step 404) for the set point. An absolute percentage difference is calculated (step 406) from the stored value and the real time reading. In a preferred embodiment the calculation used to determine the difference is:

$$I_D=[I_{cal}-I_{mag}]$$

where $I_D$ is the absolute value of base line calibration measurement ($I_{cal}$) minus the real-time measurement ($I_{mag}$). The retrieved $I_{cal}$ is assigned a value of 100%. An error from the 100% is calculated (step 408). The percentage difference E % from the baseline calibration is calculated by the following equation:

$$E\%=100*(1-(I_D/I_{cal})$$

Upon calculation of the percentage difference, the meter or display of the neutralization system 110 is updated (step 410) to indicate operating conditions of the ionizer bar 114. The percentage difference E % is compared against threshold limits for the ionizer bar selected (step 412). A clean bar indicator (not shown) is illuminated when the threshold limit is exceeded (step 414). The threshold for the limit wherein the ionizer bar should be cleaned can be configured by the user, a sensor, a microprocessor, or set by software coupled to or located within the controller 120. Other main loop processes (step 416), including the determination of the neutralization current during the sampling period 204 (step 418) and adjustment of the operating set point (step 420) occur as well.

Use of the sampling period 204 can also aid in making the self-calibration and performance indication of the neutralization system more efficient. In accordance with a preferred embodiment of the present invention, the current magnitude $I_{mag}$ is determined by the controller 120 during the sampling period 204 (i.e., in step 418). Thus, the calibration set point is preferably identical to the sensing levels described above (e.g., nominal amplitude and 50/50 duty cycle or the like). By determining the neutralization current magnitude based on the sensing levels during the sampling period 204, the results can be compared to a single data point, rather than to hundreds of set points. Steps 402 and 404 in FIG. 5 would thereby be eliminated. In addition, such a method would remove the need for obtaining calibration data for hundreds of baseline values at the start of operation. However, it is contemplated that other conventional methods for determining error and operating condition in the neutralization system 110 can be used as well.

Figure 6:
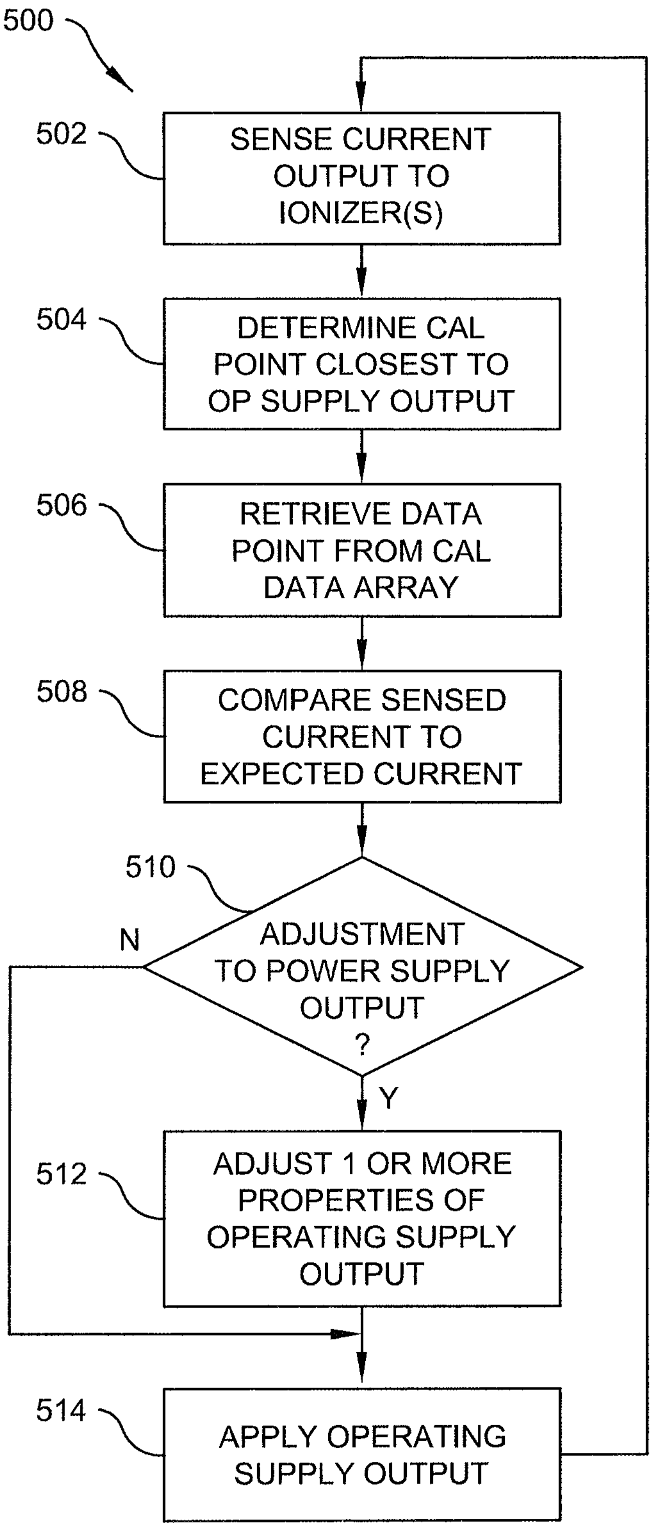
FIG. 6 is a flowchart of a process for sensing target object charge and adjusting neutralization settings in accordance with another embodiment of the present invention.

In an alternative embodiment, current sensing may be performed with much greater frequency and at operating output levels. FIG. 6 is a flow chart for an exemplary method 500 of such an embodiment. It should be noted that this method requires collection of calibration data, specifically current flows, for the possible operating set points of the neutralization system 110. A method for collecting calibration data is described below with reference to FIG. 7. Referring to FIG. 6, at step 502, while the HV power supplies 122*a*, 122*b* are outputting signals at operating levels to the respective ionizing pins 114*a*, 114*b*, current output is detected. At step 304, the calibration point closest to the present operating level of the neutralization system 110 is determined. At step 506, the data from the determined calibration point is retrieved from memory 121. The order of steps 502, 504, and 506 in FIG. 6 is exemplary only, and may occur in different order, such as retrieval of the calibration data prior to sensing of the immediate current flow.

At step 508, the sensed current is compared to the expected current based on the calibration data. At step 510, a determination is made as to whether an adjustment to one or more properties of the output from the HV power supplies 122*a*, 122*b* is necessary to optimize neutralization of the target 112. If so, such adjustments are made at step 512 and applied at step 514. If not, the controller 120 skips step 512 and continues applying (step 514) the present output. The method 500 is repeated as needed.

Figure 7:
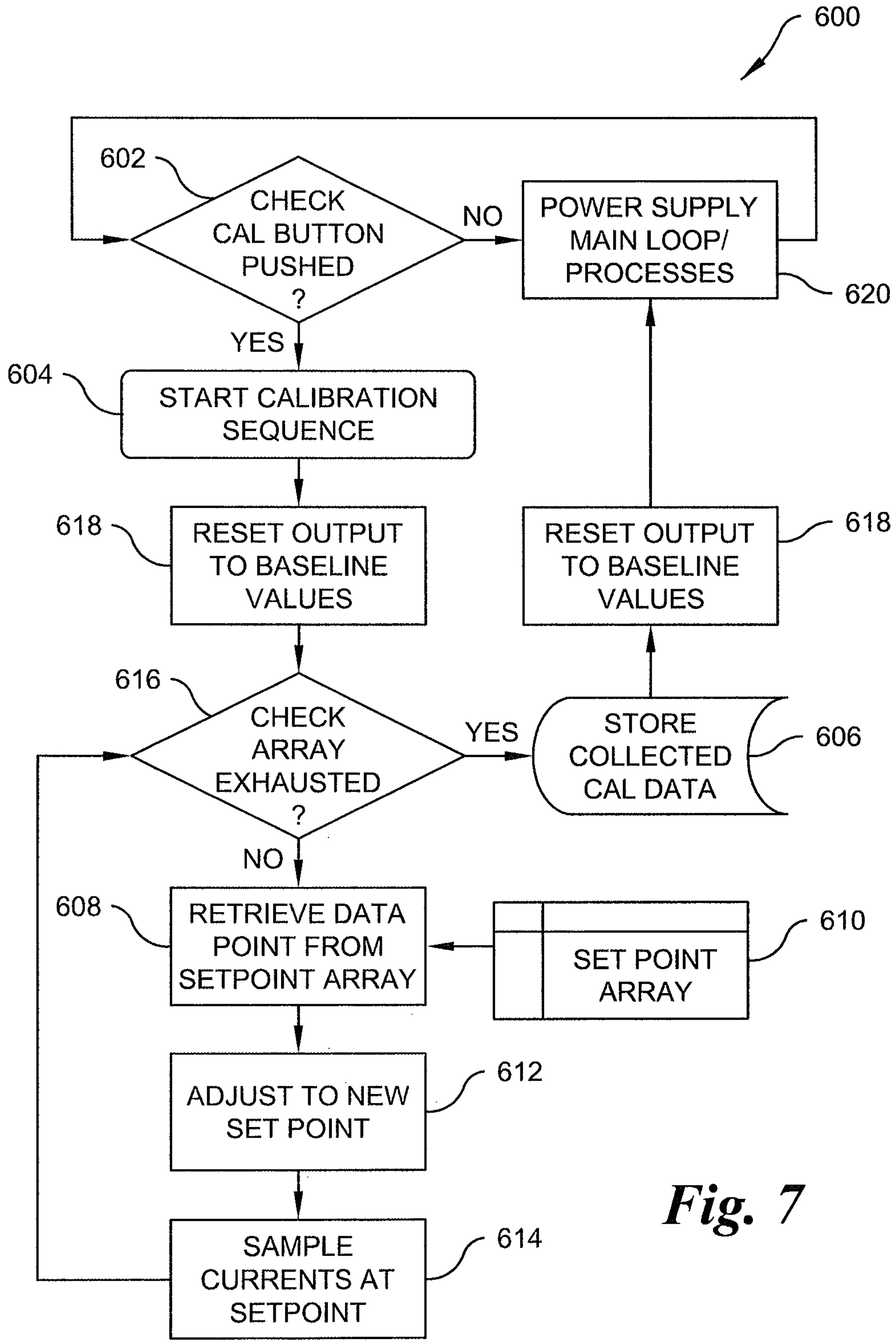
FIG. 7 is a flowchart of a process for collecting calibration data in accordance with embodiments of the present invention.

FIG. 7 is a flowchart illustrating a method 600 for the collection of the calibration data. In the example shown in the flowchart, a calibration button of the neutralization system 110 is pushed (step 602) to enter a calibration mode. Thereafter, a calibration module or sequence 604 is started. During this sequence, a plurality of baseline output currents of the ionizer are measured at one or more points of the HV power supplies 122*a*, 122*b* to the ionizer bar 114. These output measurements are compiled as the baseline calibration data at each of the points measured. The set points in memory cover all setting ranges, preferably by uniformly dividing the range and determining the set points. In one embodiment, 250 set points may be stored in the memory 121 for compiling the baseline currents data. The baseline currents are measured and stored at each point (step 606).

In a preferred embodiment, the calibration sequence is started (step 604), and the output current of the ionizer at a plurality of points is measured and stored at each point. The set points are retrievable from the memory 121 or from another input source (step 608). The set points cover all setting ranges. To cover all setting ranges, the range is uniformly divided and the set points are determined. In a preferred embodiment, a range of 100-300 set points are measured and stored, as a set point array (step 610). In a more preferred embodiment, 250 set points are measured and stored. The HV power supplies 122*a*, 122*b* are set to each of the points (step 612) and the current data is sampled at each of the points (step 614). When there is no more set points to implement (step 616), and the data is collected at each of the points, the calibration data is stored (step 606). In other preferred embodiments, the data is stored throughout the collection process. During this calibration the output values of the current are reset to the baseline values for the ionizer bar 114*a* (step 618). The HV power supplies 122*a*, 122*b* then return to normal operation (step 620).

From the foregoing, it can be seen that embodiments of the present invention comprise a method and apparatus for optimizing neutralization of a target object. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for optimizing performance of a static neutralizing power supply coupled to a controller and configured to provide an output to at least one ionizer, the power supply having a first operating state such that one or more properties of the output are set to fixed non-zero baseline levels, and a second operating state such that the one or more properties of the output are set to neutralizing levels, the fixed non-zero baseline level for at least one of the one or more properties being different than the neutralizing level for the at least one of the one or more properties, the controller being configured to switch the power supply between the first and second operating states during a sequence of a plurality of alternating first and second time periods, the method comprising:

(a) during the first time period, sensing a current flow to the at least one ionizer with the power supply set to the first operating state;

(b) comparing, in the controller, an expected current flow in the first operating state to the sensed current flow, wherein a difference between the expected and sensed current flows is proportional to a charge on an object to be neutralized proximate the at least one ionizer;

(c) based on the comparison, adjusting, by the controller, at least one of the neutralizing levels for the one or more properties of the output of the power supply in the second operating state, wherein adjustments are made only in response to comparisons with current flows sensed in the first time period:

(d) applying, during the immediately succeeding second time period, the adjusted neutralizing levels for the one or more properties of the output of the power supply in the second operating state to neutralize the charge on the object; and (e) repeating steps (a)-(d) for successive pairs of the first and second time periods.

2. The method of claim 1, wherein the at least one ionizer includes at least one positive ionizer and at least one negative ionizer.

3. The method of claim 2, wherein the sensed current flow is a net of current flow to the at least one positive ionizer and current flow to the at least one negative ionizer.

4. The method of claim 3, wherein the one or more properties of the output includes a first amplitude applied to the at least one positive ionizer, a second amplitude applied to the at least one negative ionizer, and a duty cycle, wherein the fixed non-zero baseline level for each of the first and second amplitudes is between about 4 kV to about 20 kV, and wherein the fixed non-zero baseline level for the duty cycle is 50/50.

5. The method of claim 4, further comprising:

(f) during the first time period, summing the current flow to the at least one positive ionizer and the current flow to the at least one negative ionizer to determine a current magnitude with the power supply set to the first operating state;

(g) comparing the current magnitude to calibration data to determine difference values, the calibration data having been obtained with the output of the power supply being set at the fixed non-zero baseline levels for the first and second amplitudes and the 50/50 duty cycle; and (h) using the difference values to determine a relative condition of the at least one positive ionizer and the at least one negative ionizer.

6. The method of claim 4, wherein the adjustment to the at least one of the neutralizing levels includes an adjustment to the neutralizing level of at least one of the first amplitude, the second amplitude, or the duty cycle of the output.

7. The method of claim 2, wherein during each first time period, the sensed current flow is the current flow to one of the at least one positive ionizer and the at least one negative ionizer.

8. The method of claim 7, wherein the adjustment to the at least one neutralizing level only affects the output to the other of the at least one positive ionizer and the at least one negative ionizer.

9. The method of claim 2, wherein during both of the first and second time periods the output to each of the at least one positive and negative ionizers is a uni-polar DC signal.

10. The method of claim 1, wherein a ratio of a length of the second time period to a length of the first time period is about 10:1.

11. A method for optimizing performance of a static neutralizing power supply coupled to a controller and configured to provide a first output having a first amplitude to at least one positive ionizer and a second output having a second amplitude to at least one negative ionizer, the power supply having a first operating state such that one or more of the first amplitude, the second amplitude, or a duty cycle of the first and second outputs are set to fixed non-zero baseline levels, and a second operating state such that the one or more of the first amplitude, the second amplitude, or the duty cycle are set to neutralizing levels, the fixed non-zero baseline level for at least one of the first amplitude, the second amplitude, or the duty cycle being different than the neutralizing level for the at least one of the first amplitude, the second amplitude, or the duty cycle, the controller being configured to switch the power supply between the first and second operating states during a sequence of a plurality of alternating first and second time periods, the method comprising:

(a) during the first time period, sensing a first current flow to the at least one positive ionizer and a second current flow to the at least one negative ionizer with the power supply set to the first operating state;

(b) determining a net current flow from the first and second current flows;

(c) comparing, in the controller, an expected net current flow in the first operating state to the determined net current flow, wherein a difference between the expected and sensed current flows is proportional to a charge on an object to be neutralized proximate the at least one positive ionizer and the at least one negative ionizer;

(d) based on the comparison, adjusting, by the controller, at least one of the neutralizing levels for the duty cycle, the first amplitude, or the second amplitude provided by the power supply in the second operating state, wherein adjustments are made only in response to comparisons with the net current flow determined in the first time period;

(e) applying, during the immediately succeeding second time period, the at least one of the adjusted neutralizing levels for the duty cycle, the first amplitude, or the second amplitude in the second operating state to neutralize the charge on the object; and (f) repeating steps (a)-(e) for successive pairs of the first and second time periods.

12. A static neutralizing apparatus comprising:

(a) a power supply;

(b) at least one ionizer coupled to the power supply and receiving an output therefrom, the power supply having a first operating state such that one or more properties of the output are set to fixed non-zero baseline levels, and a second operating state such that the one or more properties of the output are set to neutralizing levels, the fixed non-zero baseline level for at least one of the one or more properties of the output being different than the neutralizing level for the at least one of the one or more properties; and (c) a controller coupled to the power supply to control the output to the at least one ionizer, the controller being configured to:

(i) switch the power supply between the first and second states during a sequence of a plurality of alternating first and second time periods, (ii) during the first time period, sense a current flow to the at least one ionizer with the power supply set to the first operating state, (iii) compare an expected current flow in the first operating state to the sensed current flow, wherein a difference between the expected and sensed current flows is proportional to a charge on an object to be neutralized proximate the at least one ionizer, (iv) based on the comparison, adjust at least one of the neutralizing levels for the one or more properties of the output of the power supply in the second operating state, wherein adjustments are made only in response to comparisons with current flows sensed in the first time period, (v) apply, during the immediately succeeding second time period, the adjusted neutralizing levels for the one or more properties of the output of the power supply in the second operating state to neutralize the charge on the object, and (vi) periodically repeat steps (ii)-(v) for successive pairs of the first and second time periods.

13. The apparatus of claim 12, wherein the at least one ionizer includes at least one positive ionizer and at least one negative ionizer.

14. The apparatus of claim 13, further comprising a memory in communication with the controller.

15. The apparatus of claim 14, wherein the memory is configured to store calibration data for determining a performance of the at least one positive ionizer and the at least one negative ionizer, the controller being further configured to:

(vii) during the first time period, sum the current flow to the at least one positive ionizer and the current flow to the at least one negative ionizer to determine a current magnitude with the power supply set to the first operating state;

(viii) compare the current magnitude to the calibration data to determine difference values; and (ix) use the difference values to determine a relative condition of the at least one positive ionizer and the at least one negative ionizer.

16. The apparatus of claim 13, wherein the one or more properties of the output includes a first amplitude applied to the at least one positive ionizer, a second amplitude applied to the at least one negative ionizer, and a duty cycle, wherein each the fixed non-zero baseline level for each of the first and second amplitudes is between about 4 kV to about 20 kV, and wherein the fixed non-zero baseline level for the duty cycle is 50/50.

17. The apparatus of claim 12, wherein the power supply, at least one ionizer, and controller are disposed within a common housing.

18. The apparatus of claim 12, wherein the controller and the power supply are housed separately from the at least one ionizer and the power supply is coupled to the at least one ionizer by a high voltage cable.

* * * * *